United States Patent [19]

Duc et al.

[11] Patent Number: 4,682,294
[45] Date of Patent: Jul. 21, 1987

[54] ELECTRIC ENERGY DISTRIBUTING DEVICES COMPRISING MICROPROCESSORS

[75] Inventors: Michel Duc, Savigny S/Orge; Philippe Montreuil, Torcy; Jean-Jacques Meuleman, Orsay, all of France

[73] Assignees: Automobiles Citroen, Neuilly-sur-Seine; Automobiles Peugeot, Paris, both of France

[21] Appl. No.: 661,669

[22] Filed: Oct. 17, 1984

[30] Foreign Application Priority Data

Oct. 18, 1983 [FR] France .................................. 83 16843

[51] Int. Cl.$^4$ ............................................. G06F 11/20
[52] U.S. Cl. ....................................... 364/492; 307/38; 371/62
[58] Field of Search ............ 364/492, 493, 483, 431.11; 371/62; 307/31, 32, 38, 40

[56] References Cited

U.S. PATENT DOCUMENTS

| | | | |
|---|---|---|---|
| 4,399,537 | 8/1983 | Jones | 371/62 X |
| 4,454,509 | 6/1984 | Buennagel et al. | 364/492 X |
| 4,488,303 | 12/1984 | Abramovich | 371/62 |
| 4,532,594 | 7/1985 | Hosaka et al. | 364/431.11 |
| 4,538,273 | 8/1985 | Lasser | 371/62 |
| 4,549,274 | 10/1985 | Lerner et al. | 364/492 |
| 4,572,963 | 2/1986 | Nakano et al. | 307/38 X |

*Primary Examiner*—Gary Chin
*Assistant Examiner*—H. R. Herndon
*Attorney, Agent, or Firm*—Karl F. Ross; Herbert Dubno

[57] ABSTRACT

The present invention provides a device for distributing electric energy between a current source and several groups of electric current consumers or peripherals $P_1$, $P_2 \ldots P_n$ which is more particularly intended to be placed on board a motorized land, air or sea vehicle and comprises at least a first conductor for conveying the electric energy supplying the current consumers, at least a second conductor for conveying electric control signals and/or receiving information about the state of the current consumers, and at least one central control unit $U_1$ comprising means for transmitting, receiving, storing and processing coded information for controlling the start up or shut down of the current consumers.

In this device, each group of current consumers or peripherals comprise the same microprocessor or programmed means, with the same program and an address recognition circuit associated with this microprogrammed means allowing this latter to recognize itself.

2 Claims, 3 Drawing Figures

ELECTRIC ENERGY DISTRIBUTING DEVICES COMPRISING MICROPROCESSORS

FIELD OF THE INVENTION

The present invention relates to devices for distributing electric energy between a current source and current consumers or peripherals, in particular those intended to be placed on board a motorized land, air or sea vehicle.

BACKGROUND OF THE INVENTION

Electrical distributors are known which comprise at least one conductor for conveying the electric energy supplying the current consumers, at least a second conductor for conveying electric control signals and/or for receiving information about the state of the current consumers, and at least one central control unit comprising means for transmitting, receiving, storing and processing coded information for controlling the start-up or the shut-down of the current consumers.

OBJECT OF THE INVENTION

The object of the present invention is to provide an improved energy distributing device at low cost.

SUMMARY OF THE INVENTION

According to the invention, each group of current consumers or peripherals comprises the same microprocessor or microprogrammed means, with the same program and an address recognition circuit associated with this microprogrammed means allowing it to recognize itself.

The device thus requires only a single type of microprogrammed means and not as many types of microprogrammed means as there are current consumers.

Preferably, the address recognition circuit comprises a control flip-flop, a wired binary combination and a channel switch which is controlled by the flip-flop and adapted for transmitting to the microprogrammed means the binary code given by the wired binary combination.

BRIEF DESCRIPTION OF THE DRAWING

One embodiment of an electric energy distribution device in accordance with the invention will be described hereafter by way of non limitative example with reference to the accompanying drawings in which.

SPECIFIC DESCRIPTION

Figure 1:
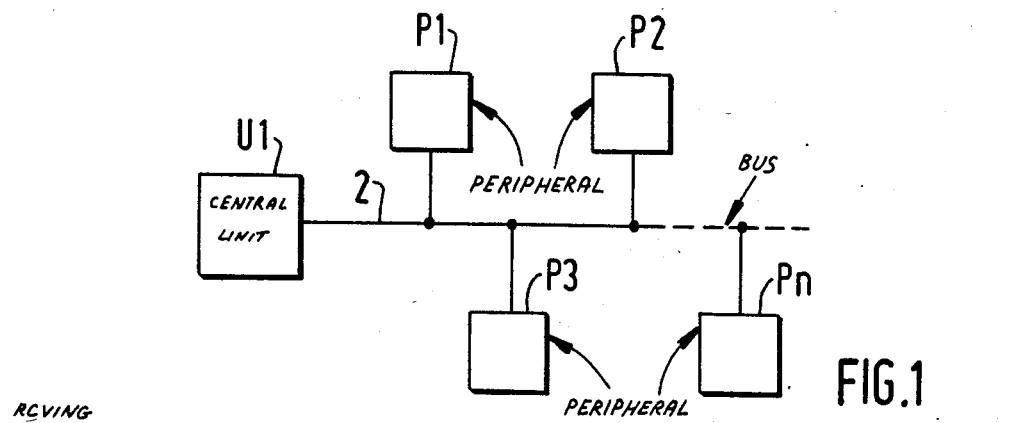
FIG. 1 is a block diagram of the entire device.

In FIG. 1, a central unit $U_1$ in connected by a bus 2 to a number of peripherals $P_1, P_2 \ldots P_n$.

Figure 2:
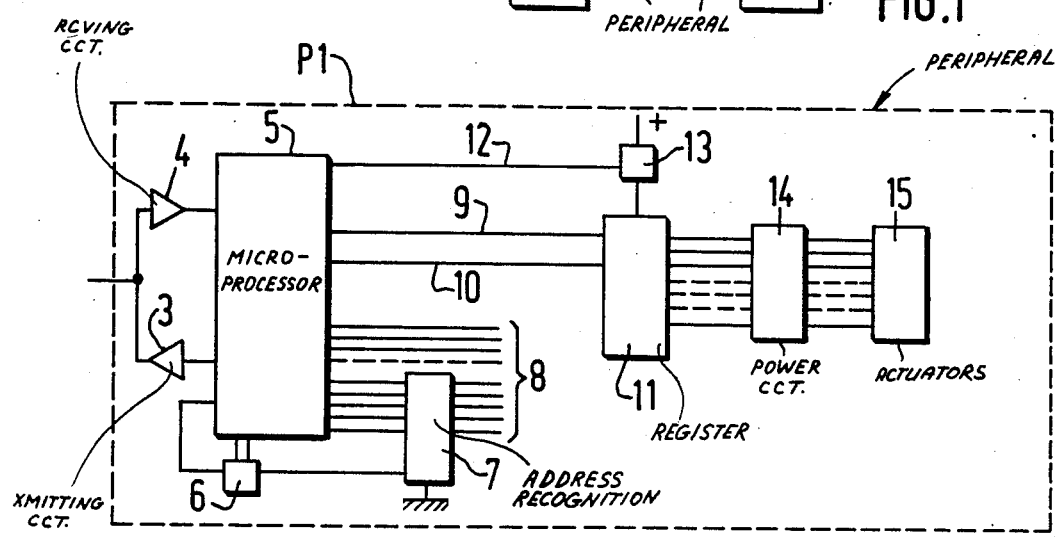
FIG. 2 is a block diagram of an energy consumer or peripheral.

In FIG. 2, the peripheral element $P_1$ comprises a transmitting circuit 3, a receiving circuit 4 and a microprocessor or microprogrammed means 5 connected to a "watch dog circuit" 6 which is in turn connected to an address recognition circuit 7, circuit 7 being inserted between the inputs/outputs 8 of the microprocessor 5. This latter is connected by lines 9 and 10 to the inputs of a series-parallel register 11 and by a line 12 to a device 13 controlling the supply of this register. The outputs of this latter are connected to a power circuit 14 itself controlling an assembly of actuators 15.

Figure 3:
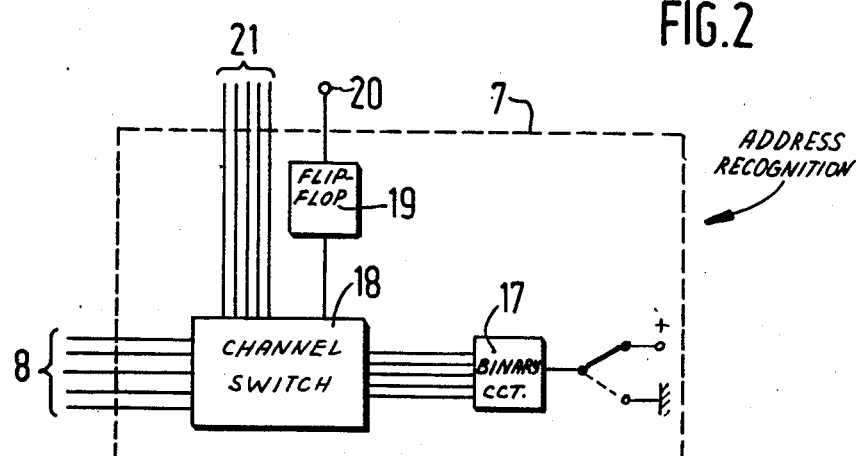
FIG. 3 is a block diagram of the address recognition device.

As can be seen in FIG. 3, the address recognition circuit 7 is composed of a cabled binary combination 17 (i.e. a circuit whose outputs assume binary levels to represent a binary code word) communicating a binary code word selected by input switching to a channel switch 18 and connected either to ground or to the positive pole.

When it is controlled by the flip-flop 19, connected by the output 20 to the watch dog 6, the channel switch 18 transmits to the microprogrammed means 5 the binary code given by the wired binary combination 17.

The operation of the device is as follows.

At the end of initialization, flip-flop 19 of circuit 7 receives a pulse of level 1 at its input connected to the watch dog 6 (safety device for the microprocessor which stops the operation of the program should an abnormality occur) and controls the channel switch 18. This switching then allows the microprocessor 5 to read the binary code given by the wired binary combination 17.

The microprocessor 5 is thus coded at the ports concerned in accordance with the binary code allowing it to recognize itself in the sense that it recognizes, as noted below, the code which causes a particular peripheral associated with the microprocessor to be operated by one of the specific subprograms in the microprocessor and which is addressed by the code.

The beginning of the program, common to all the peripherals $P_1 \ldots P_n$, reads the inputs at which the binary code is present. This value is first of all multiplied by two then the result is added to the basic address of the table of addresses.

The value read stored in memory is multiplied by two because the address of the program is coded over P bytes.

The sum of this value and of the value of the basic address of the table of addresses is calculated. The address of the specific program of the peripheral concerned corresponds to this new value in the table of addresses; this program is then executed.

Thus, for example, if the value read is 00000010, i.e. binary 2, the value multiplied by 2 becomes 00000100 in binary notation, i.e. 4. If the basic address of the table of addresses is 1000, the sum of the basic address and of the value read multiplied by two will be 1000+4, i.e. 1004; this address thus obtained corresponds to a memory position which contains the address of the beginning of the program of the peripheral having as external code 00000010.

The program common to all the microprogrammed means comprises then on the one hand a program beginning which reads the imputs at which the wired binary code is present, multiplies by two the value read and adds the new value obtained to a basic address stored in memory and, on the other hand, a number n of specific programs, elements of the common program (n being the number of peripherals), which are selected through the computed address.

In other words, the individual peripheral circuits, for example, the four peripheral circuits $P_1, P_2, P_3, P_4$, are all supplied at all times with the same information. Each of these peripheral circuits comprises the same microprocessor and a recognition address word of the binary code, supplied to all of these peripheral circuits $C_1, C_2, C_3, C_4$, is assigned to the respective peripheral circuit which recognizes that code because it is provided with an address recognition circuit with a wired binary address. The first part of the program each microprocessor performs is an activation of the recognition circuit to compare the code word with the wired binary code.

All of the microprocessors have the same programs and these programs include, in addition to the initial recognition program, a group of subprograms each specific to a particular peripheral circuit but present in each of the microprocessors. These programs can be considered to be stored at addresses $A_1$, $A_2$, $A_3$ and $A_4$ of each of the microprocessors but which respectively are assigned to the particular subroutines to be performed at the respective peripheral circuits $P_1$, $P_2$, $P_3$ and $P_4$.

In order to cause operation of the peripheral circuit $P_1$, the code to which is added the guide $C_1$ (multiplied by two in accordance with the principles described), all of the peripherals compare the incoming data with their respective wire recognition code, but only the peripheral $P_1$ has a match through its wired recognition code. At the peripheral $P_1$, therefore, the microprocessor searches through its addresses as signaled by the code $C_1$, finds the proper address $A_1$ and continues programming the peripheries in accordance with this subroutine or subprogram. Because the code $C_2$ is different from the code $C_1$, only the periphery 2 continues its program to the address search, finding the proper address $A_2$.

According to the previously chosen example, the table of addresses would be in the following form:

| Address | Contents |
|---------|----------|
| 1000    | 20       |
| 1001    | 00       |
| 1002    | 30       |
| 1003    | 00       |
| 1004    | 40       |
| 1005    | 00       |
| 1006    | 50       |
| 1007    | 00       |
| 1008    | 60       |
| 1010    | 00       |

It goes without saying that the present invention should not be considered as limited to the embodiment described and shown, but covers on the contrary all variants thereof.

What is claimed is:

1. A device for distributing electrical energy, particularly in vehicles, from a current source to a multiplicity of peripherals electrically connected to said source, said device comprising:

a central control unit provided with means for transmitting, receiving, storing and processing coded information for controlling the startup and shutdown of current controllers of said peripherals;

a coded information bus connected to said central control unit; and a peripheral circuit for each of said peripherals, each of said peripheral circuits including microprogrammed means programmed with subprograms for each of said peripherals and identical to those of the other microprogrammed means of the other peripheral circuits at respective addresses so that each of the microprogrammed means have identical sets of said subprograms for each of said peripherals, and with an address recognition circuit responsive to coded information received from said bus for identifying the coded information for each particular peripheral circuit and then addressing a specific one of said subprograms to be carried out at the particular peripheral circuit for controlling the operation of a respective current controller.

2. A device for distributing electrical energy, particularly in vehicles, from a current source to a plurality of peripherals electrically connected to said source, said device comprising:

a central control unit provided with means for transmitting, receiving, storing and processing coded information for controlling the startup and shutdown of current controllers of said peripherals;

a coded information bus connected to said central control unit; and a peripheral circuit for each of said peripherals, each of said peripheral circuits including microprogrammed means programmed with subprograms for each of said peripherals and identical to those of the other microprogrammed means of the other peripheral circuits at respective addresses, and with an address recognition circuit responsive to coded information received from said bus for identifying the coded information for each particular peripheral circuit and then addressing a specific one of said subprograms to be carried out at the particular peripheral circuit for controlling the operation of a respective current controller, the address recognition circuits comprising a control flip flop, a wired binary combination and a channel switch which is controlled by the flip flop for transmitting to the microprogrammed means a binary code given by the wired binary combination.

* * * * *